(12) United States Patent
Yamazaki

(10) Patent No.: US 11,110,982 B2
(45) Date of Patent: Sep. 7, 2021

(54) BICYCLE HUB UNIT

(71) Applicant: Shimano Inc., Osaka (JP)

(72) Inventor: Azusa Yamazaki, Osaka (JP)

(73) Assignee: Shimano Inc., Osaka (JP)

( * ) Notice: Subject to any disclaimer, the term of this patent is extended or adjusted under 35 U.S.C. 154(b) by 489 days.

(21) Appl. No.: 15/964,020

(22) Filed: Apr. 26, 2018

(65) Prior Publication Data

US 2018/0362108 A1 Dec. 20, 2018

(30) Foreign Application Priority Data

Jun. 20, 2017 (JP) .............................. JP2017-120484

(51) Int. Cl.

| B62J 6/12 | (2006.01) |
|---|---|
| B60B 27/00 | (2006.01) |
| B60B 27/02 | (2006.01) |
| B60B 27/04 | (2006.01) |
| B62M 9/12 | (2006.01) |

(52) U.S. Cl.
CPC ............. *B62J 6/12* (2013.01); *B60B 27/0047* (2013.01); *B60B 27/023* (2013.01); *B60B 27/04* (2013.01); *B60B 27/0068* (2013.01); *B60B 2900/311* (2013.01); *B60Y 2400/204* (2013.01); *B62M 9/12* (2013.01)

(58) Field of Classification Search
CPC .... B62J 6/12; B60B 27/0047; B60B 27/0068; B60B 27/02; B60B 27/023; B60B 27/026; B60B 27/04; B60B 2900/121; B60B 2900/311; B60Y 2400/204; B62M 9/10; B62M 9/12; B62M 9/127

See application file for complete search history.

(56) References Cited

U.S. PATENT DOCUMENTS

| 5,450,915 A * | 9/1995 | Li ............................ B62M 6/40 180/65.51 |
| 6,089,675 A * | 7/2000 | Schlanger ............. B60B 27/023 280/279 |
| 6,278,216 B1 * | 8/2001 | Li ........................ B60K 7/0007 310/424 |

(Continued)

FOREIGN PATENT DOCUMENTS

| CN | 200960960 Y | 10/2007 |
| EP | 2 930 096 A1 | 10/2015 |

(Continued)

*Primary Examiner* — Tony H Winner
*Assistant Examiner* — Maurice L Williams
(74) *Attorney, Agent, or Firm* — Global IP Counselors, LLP

(57) ABSTRACT

A bicycle hub unit configured to be stably coupled to a frame of a bicycle includes a hub axle and a rotation restriction member. The hub axle is configured to be coupled to the frame of the bicycle. The rotation restriction member is configured to couple the hub axle to the frame so that rotation relative to the hub axle and the frame is restricted. At least one of the hub axle and the rotation restriction member has a cable guide structure configured to guide a cable, which electrically connects an electric component and an electronic component, in a region including the rotation restriction member in an axial direction parallel to a center longitudinal axis of the hub axle.

23 Claims, 4 Drawing Sheets

(56) References Cited

U.S. PATENT DOCUMENTS

| | | | | |
|---|---|---|---|---|
| 6,409,281 B1* | 6/2002 | Kanehisa | ............. | B60B 27/026 301/110.5 |
| 6,669,306 B1* | 12/2003 | Hara | ................. | B60B 27/0078 280/288 |
| 6,924,569 B2* | 8/2005 | Endo | ......................... | B62J 6/12 310/67 A |
| 6,992,413 B2* | 1/2006 | Endo | ......................... | B62J 6/12 310/216.045 |
| 7,042,123 B2* | 5/2006 | Kitamura | ............. | B62M 25/08 280/260 |
| 7,195,088 B2* | 3/2007 | Matsueda | ............. | B62K 25/30 180/206.5 |
| 7,282,831 B2* | 10/2007 | Lin | ............................ | B62J 6/12 310/206 |
| 7,568,558 B2* | 8/2009 | Fukui | ..................... | B62K 19/38 188/18 R |
| 7,669,871 B2* | 3/2010 | Watarai | ................. | B62K 25/02 280/260 |
| 7,909,412 B2* | 3/2011 | Ashman | ................. | B62K 25/02 301/110.5 |
| 8,884,481 B2* | 11/2014 | Hasegawa | ............ | H02K 7/1846 310/263 |
| 9,758,209 B2* | 9/2017 | Schlanger | ............. | B60B 27/026 |
| 9,815,329 B2* | 11/2017 | Schlanger | ............. | B62K 25/02 |
| 2004/0262065 A1* | 12/2004 | Horiuchi | ................ | B62K 21/02 280/276 |
| 2006/0194660 A1* | 8/2006 | Shahana | ................ | B62M 9/1244 474/82 |
| 2013/0049448 A1* | 2/2013 | Kitamura | ........... | B60B 27/0068 301/110.5 |
| 2013/0285515 A1* | 10/2013 | Yang | ......................... | B62J 6/12 310/75 C |
| 2016/0176475 A1* | 6/2016 | Piele | ....................... | B62M 6/50 301/6.5 |
| 2017/0259663 A1* | 9/2017 | Chan | ....................... | B62M 6/45 |

FOREIGN PATENT DOCUMENTS

| | | |
|---|---|---|
| JP | 2004-82847 A | 3/2004 |
| JP | 2014-111396 A | 6/2014 |

* cited by examiner

BICYCLE HUB UNIT

CROSS-REFERENCE TO RELATED APPLICATIONS

This application claims priority to Japanese Patent Application No. 2017-120484, filed on Jun. 20, 2017. The entire disclosure of Japanese Patent Application No. 2017-120484 is hereby incorporated herein by reference.

BACKGROUND

Field of the Invention

The present invention generally relates to a bicycle hub unit.

Background Information

A known bicycle hub unit supports a wheel of a bicycle. The bicycle hub unit includes a hub axle coupled to a frame of the bicycle and a hub body provided on the hub axle to be rotatable about the hub axle and supporting the wheel of the bicycle. Japanese Laid-Open Patent Publication No. 2004-82847 (Patent document 1) discloses one example of a prior art bicycle hub unit.

SUMMARY

It is desirable that a bicycle hub unit be stably coupled to a frame of a bicycle.

It is an object of the present invention to provide a bicycle hub unit configured to be stably coupled to a frame of a bicycle.

In accordance with a first aspect of the present invention, a bicycle hub unit includes a hub axle and a rotation restriction member. The hub axle is configured to be coupled to a frame of a bicycle. The rotation restriction member is configured to couple the hub axle to the frame so that rotation relative to the hub axle and the frame is restricted. At least one of the hub axle and the rotation restriction member has a cable guide structure configured to guide a cable, which electrically connects an electric component and an electronic component, in a region including the rotation restriction member in an axial direction parallel to a center longitudinal an axis of the hub axle. The hub axle is coupled to the frame so that the rotation restriction member restricts the rotation of the hub axle relative to the frame. Thus, the bicycle hub unit is stably coupled to the frame. Additionally, the cable is guided by the cable guide structure configured to guide the cable. This limits interference of the cable with various elements included in the bicycle hub unit.

In accordance with a second aspect of the present invention, the bicycle hub unit according to the first aspect further includes the electronic component fixed to the hub axle. The rotation restriction member sets the rotational phase of the hub axle with respect to the frame to a predetermined rotational phase. Thus, in a state where the bicycle hub unit is coupled to the frame, the electronic component is set to a predetermined position with respect to the frame. Therefore, the bicycle hub unit is coupled to the frame so that the electronic component is located at the appropriate position.

In accordance with a third aspect of the present invention, the bicycle hub unit according to the first or second aspect is configured so that the rotation restriction member is detachably attached to the hub axle. This improves the usability of the bicycle hub unit.

In accordance with a fourth aspect of the present invention, the bicycle hub unit according to any one of the first to third aspects further includes a hub body provided on the hub axle to be rotatable about the hub axle and an electric power generator that generates electric power based on rotation of the hub body relative to the hub axle and that is configured to supply generated electric power to the electronic component. Thus, electric power generated by the electric power generator can be stably supplied to the electronic component.

In accordance with a fifth aspect of the present invention, a bicycle hub unit includes a hub axle and a rotation restriction member. The hub axle is configured to be coupled to a frame of a bicycle. The hub axle includes a recess. The rotation restriction member includes a first engagement portion engaging with the recess of the hub axle. The rotation restriction member couples the hub axle to the frame so that rotation relative to the hub axle and the frame is restricted. The rotation restriction member is detachably attached to the hub axle. The hub axle is coupled to the frame so that the rotation restriction member restricts rotation of the hub axle relative to the frame. Thus, the bicycle hub unit is stably coupled to the frame.

In accordance with a sixth aspect of the present invention, the bicycle hub unit according to the fifth aspect is configured so that the recess includes a groove provided in an outer circumferential surface of the hub axle and extending parallel to a center longitudinal axis of the hub axle. Thus, the first engagement portion easily engages with the recess.

In accordance with a seventh aspect of the present invention, the bicycle hub unit according to the fifth or sixth aspect is configured so that the recess has a cable guide structure configured to guide a cable wired to the bicycle. The cable is guided by the cable guide structure configured to guide the cable. This limits interference of the cable with various elements included in the bicycle hub unit.

In accordance with an eighth aspect of the present invention, the bicycle hub unit according to any one of the fifth to seventh aspects is configured so that the rotation restriction member has a cable guide structure configured to guide a cable wired to the bicycle. The cable is guided by the cable guide structure configured to guide the cable. This limits interference of the cable with various elements included in the bicycle hub unit.

In accordance with a ninth aspect of the present invention, the bicycle hub unit according to any one of the first to fourth and eighth aspects is configured so that the rotation restriction member has the cable guide structure that is configured to guide the cable in the axial direction of the hub axle so that the cable is located at an outer side of an inner surface of the frame, which is located closer to a center line of the frame with respect to the axial direction of the hub axle. This limits interference of the cable with various elements included in the bicycle hub unit.

In accordance with a tenth aspect of the present invention, the bicycle hub unit according to the ninth aspect is configured so that the cable guide structure is further configured to guide the cable in a radial direction of the hub axle between the inner surface and an outer surface of the frame opposite to the inner surface. This limits interference of the cable with external elements.

In accordance with an eleventh aspect of the present invention, the bicycle hub unit according to any one of the first to fourth and eighth to tenth aspects is configured so that the cable guide structure includes a groove configured to guide the cable. Thus, the cable is appropriately guided by the groove of the rotation restriction member.

In accordance with a twelfth aspect of the present invention, a bicycle hub unit includes a hub axle, a hub body, an electric power generator and a guide member. The hub axle is configured to be coupled to a frame of a bicycle. The hub body is provided on the hub axle to be rotatable about the hub axle. The electric power generator generates electric power based on rotation of the hub body relative to the hub axle. The guide member is provided on the hub axle so that rotation relative to the hub axle is restricted. The guide member has a cable guide structure configured to guide a cable, which is electrically connected to the electric power generator, so that the cable is located at an outer side of an inner surface of the frame, which is located closer to a center line of the frame with respect to an axial direction parallel to a center longitudinal axis of the hub axle, in the axial direction of the hub axle. With the cable guided by the guide member, the hub axle is coupled to the frame. Thus, the bicycle hub unit is stably coupled to the frame. Additionally, the guide member guides the cable so that the cable is located at an outer side of the inner surface of the frame. This limits interference of the cable with various elements included in the bicycle hub unit.

In accordance with a thirteenth aspect of the present invention, the bicycle hub unit according to the twelfth aspect is configured so that the guide member has a cable guide structure configured to guide the cable in a radial direction of the hub axle between the inner surface and an outer surface of the frame opposite to the inner surface. This limits interference of the cable with external elements.

In accordance with a fourteenth aspect of the present invention, the bicycle hub unit according to the twelfth or thirteenth aspect is configured so that the guide member includes a groove configured to guide the cable. Thus, the cable is appropriately guided by the groove of the guide member.

In accordance with a fifteenth aspect of the present invention, the bicycle hub unit according to any one of the twelfth to fourteenth aspects is configured so that the guide member is detachably attached to the hub axle. This improves the usability of the bicycle hub unit.

In accordance with a sixteenth aspect of the present invention, the bicycle hub unit according to any one of the twelfth to fifteenth aspects is configured so that the guide member includes a rotation restriction member coupling the hub axle to the frame so that rotation relative to the hub axle and the frame is restricted. The hub axle is coupled to the frame so that the rotation restriction member restricts rotation of the hub axle relative to the frame. Thus, the bicycle hub unit is stably coupled to the frame.

In accordance with a seventeenth aspect of the present invention, the bicycle hub unit according to any one of the first to fourth and sixteenth aspects is configured so that the rotation restriction member includes a first engagement portion engaging with the hub axle to restrict rotation of the hub axle. Thus, the rotation restriction member appropriately restricts rotation of the hub axle.

In accordance with an eighteenth aspect of the present invention, the bicycle hub unit according to any one of the fifth to eighth and seventeenth aspects is configured so that the first engagement portion includes a first projection restricting rotation of the hub axle in one direction and a second projection restricting rotation of the hub axle in another direction. Thus, the rotation restriction member appropriately restricts rotation of the hub axle.

In accordance with a nineteenth aspect of the present invention, the bicycle hub unit according to any one of the fifth to eighth, seventeenth, and eighteenth aspects is configured so that the hub axle includes a second engagement portion engaging with the first engagement portion. Thus, the rotation restriction member appropriately restricts rotation of the hub axle.

In accordance with a twentieth aspect of the present invention, the bicycle hub unit according to any one of the first to eleventh and sixteenth to nineteenth aspects is configured so that the rotation restriction member is shaped to fit into a groove of the frame so that rotation relative to the frame is restricted. Thus, rotation of the rotation restriction member relative to the frame is appropriately restricted.

In accordance with a twenty-first aspect of the present invention, the bicycle hub unit according to the twentieth aspect is configured so that in a case where the hub axle is coupled to the frame, the groove of the frame allows the hub axle to pass through. Thus, the hub axle can be easily coupled to the frame.

In accordance with a twenty-second aspect of the present invention, the bicycle hub unit according to any one of the first to twenty-first aspects is configured so that the hub axle is configured to be provided on a rear wheel of the bicycle. Thus, the bicycle hub unit is stably coupled to the frame.

In accordance with a twenty-third aspect of the present invention, the bicycle hub unit according to any one of the first to eleventh and sixteenth to twenty-first aspects is configured so that the hub axle is provided on a rear wheel of the bicycle, and the rotation restriction portion is configured to be provided on the hub axle to be coupled to the frame at a position close to a rear sprocket of the bicycle. This limits interference of the cable wired to the bicycle hub unit with the rear sprocket.

In accordance with a twenty-fourth aspect of the present invention, the bicycle hub unit according to any one of the first to fourth and seventh to seventeenth aspects further includes the cable. This limits interference of the cable with various elements included in the bicycle hub unit.

In accordance with a twenty-fifth aspect of the present invention, the bicycle hub unit according to any one of the first to twenty-fourth aspects is configured so that the hub axle has a structure configured to be fixed to the frame with a wheel holding mechanism. Thus, the bicycle hub unit is stably coupled to the frame.

The bicycle hub unit of the present invention is stably coupled to a frame of a bicycle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Illustrated Embodiment

Figure 1:
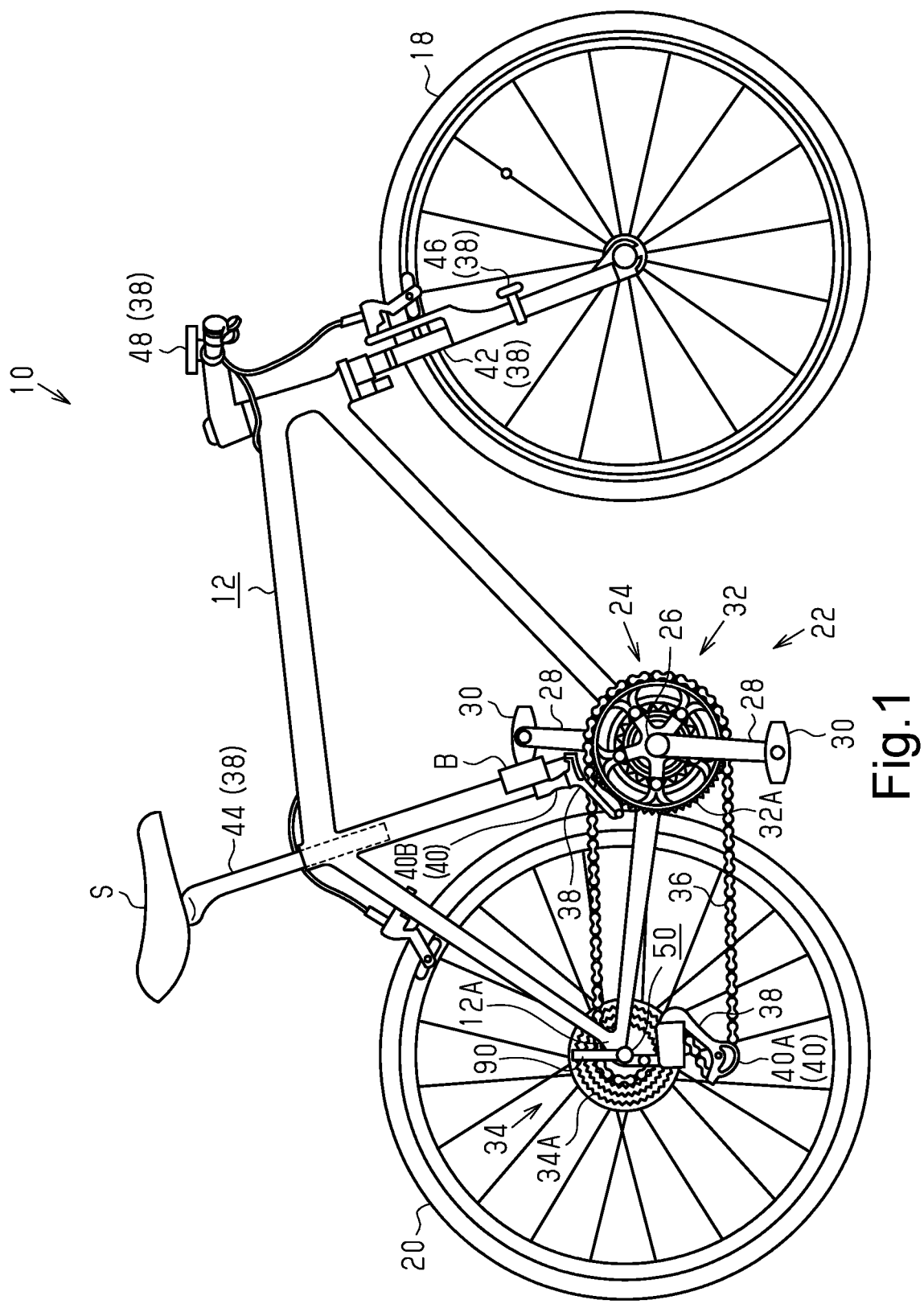
FIG. 1 is a side elevational view of a bicycle having a bicycle hub unit in accordance with one illustrated embodiment.

A bicycle 10 including a bicycle hub unit 50 will now be described with reference to FIG. 1. The bicycle 10 includes the bicycle hub unit 50 (hereinafter referred to as "the hub unit 50"). The type of the bicycle 10 shown in FIG. 1 is a mountain bike. In one example, the bicycle 10 further includes a frame 12, a front wheel 18, a rear wheel 20 and a drivetrain 22. The hub unit 50 is provided on a rear end 12A of the frame 12.

The drivetrain 22 includes a crank assembly 24, a front sprocket assembly 32, a rear sprocket assembly 34 and a chain 36. The crank assembly 24 includes a crankshaft 26, a pair of crank arms 28 and a pair of pedals 30. The pedals 30 are rotatably coupled to distal ends of the crank arms 28, respectively.

The front sprocket assembly 32 includes one or more front sprockets 32A. The front sprocket assembly 32 is provided on the crank assembly 24 to rotate integrally with the crankshaft 26. The rear sprocket assembly 34 includes one or more rear sprockets 34A. The rear sprocket assembly 34 is provided on the hub unit 50. The chain 36 runs on one of the front sprockets 32A in the front sprocket assembly 32 and one of the rear sprockets 34A in the rear sprocket assembly 34. The transmission ratio of the bicycle 10 is changed by changing the combination of the front sprocket 32A and the rear sprocket 34A on which the chain 36 runs. Driving force applied to the pedals 30 is transmitted to the rear wheel 20 through the front sprocket assembly 32, the chain 36, and the rear sprocket assembly 34.

The bicycle 10 further includes a plurality of bicycle components 38. The bicycle components 38 include, for example, an electric shifting device 40, an electric suspension 42, an electric adjustable seatpost 44, an electric power assist device (not shown), a lamp 46 and a cycle computer 48. The electric shifting device 40 includes a first shifting unit 40A and a second shifting unit 40B. The first shifting unit 40A is a rear derailleur provided on the rear end 12A of the frame 12. The second shifting unit 40B is a front derailleur provided on the frame 12 in the vicinity of the crankshaft 26. The electric suspension 42 is a front suspension that absorb shocks received by the front wheel 18 from the ground. The electric adjustable seatpost 44 operates to change the height of a saddle S with respect to the frame 12. The electric power assist device operates to assist in propulsion of the bicycle 10. Some of the elements included in the bicycle components 38 are driven by electric power supplied from a battery B mounted on the bicycle 10.

Figure 2:
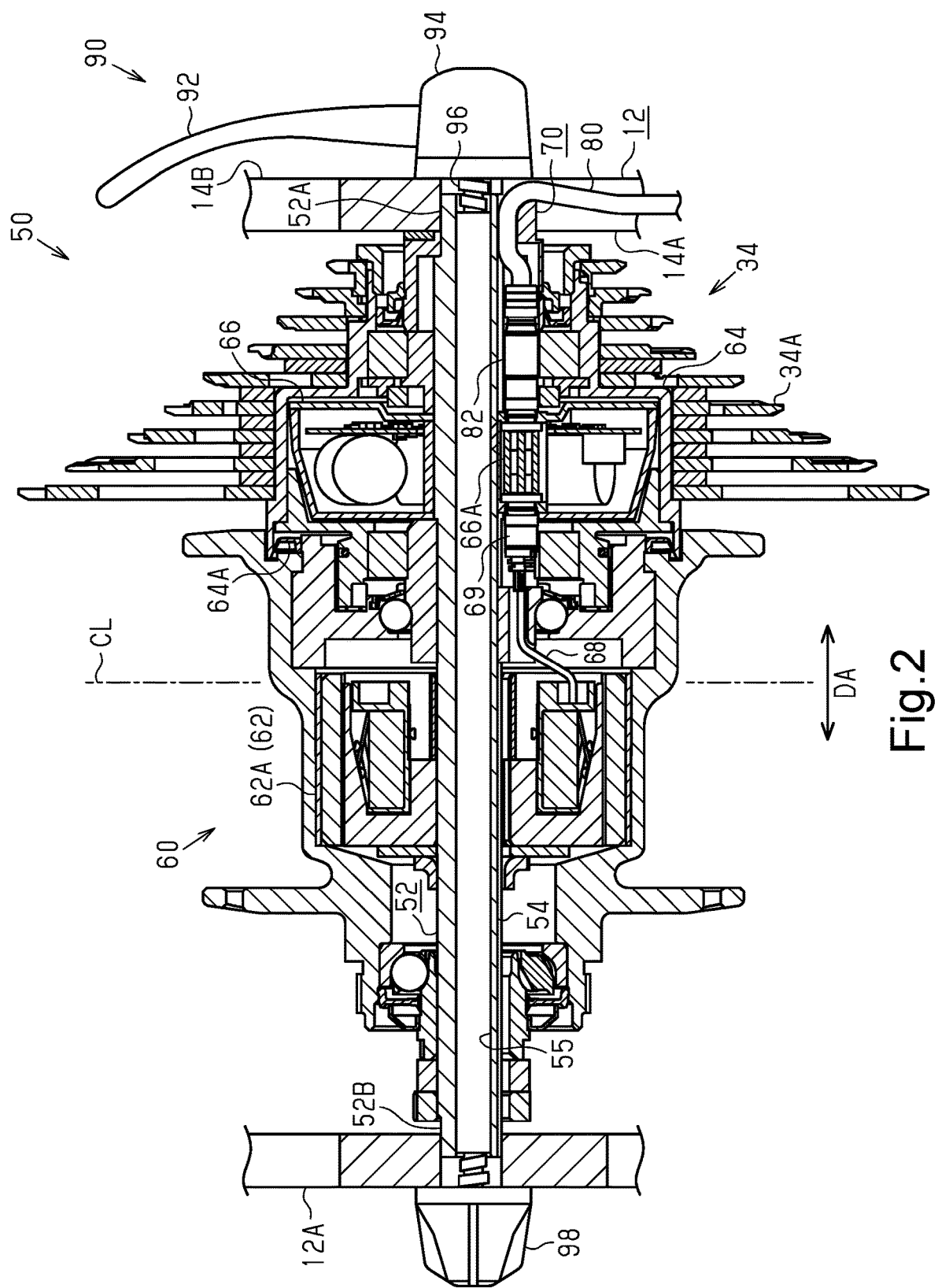
FIG. 2 is a partial longitudinal cross-sectional view of the bicycle hub unit shown in FIG. 1 with selected parts (the electrical connectors and the electrical cables) shown in elevation.

The structure of the hub unit 50 will now be described with reference to FIG. 2. The hub unit 50 includes a hub axle 52 and a rotation restriction member 70. The hub axle 52 is provided on the rear wheel 20 (refer to FIG. 1) of the bicycle 10. The hub axle 52 is coupled to the frame 12 of the bicycle 10. In one example, the hub axle 52 is coupled to the rear end 12A of the frame 12. The rotation restriction member 70 couples the hub axle 52 to the frame 12 so that rotation relative to the hub axle 52 and the frame 12 is restricted. The rotation restriction member 70 is detachably attached to the hub axle 52. The rotation restriction member 70 is provided on the hub axle 52 to be coupled to the frame 12 at a position close to the rear sprockets 34A of the bicycle 10.

The hub unit 50 further includes a hub body 60, an electric power generator 62A, a freewheel 64, an electronic component 66 and a cable 68 (i.e., an electrical cable in the illustrated embodiment). The hub body 60 is provided on the hub axle 52 to be rotatable about the hub axle 52. The hub body 60 has a structure configured to support the rear wheel 20 with a plurality of spokes (not shown).

The electric power generator 62A generates electric power based on rotation of the hub body 60 relative to the hub axle 52 and supplies the generated electric power to the electronic component 66 which preferably includes a rechargeable battery or capacitor (i.e., a rechargeable power supply). The electric power generator 62A is, for example, provided between the hub axle 52 and the hub body 60 in a radial direction of the hub axle 52. The electric power generator 62A and the electronic component 66 are electrically connected by a connector 69 of the cable 68. The electric power generator 62A is one example of an electric component 62 mounted on the bicycle 10. Here, as seen in FIG. 2, the connector 69 of the cable 68 is a male electrical connector that plugs into a female electrical connector 66A that is electrically connected to the electronic component 66.

The freewheel 64 is located next to the hub body 60 in an axial direction DA extending along the axis of the hub axle 52. The freewheel 64 is coupled to the hub body 60 to be rotatable about the hub axle 52. The freewheel 64 has a structure configured to support the rear sprockets 34A. In one example, in a case where driving force is transmitted to the rear sprockets 34A through various elements included in the drivetrain 22 (refer to FIG. 1), the freewheel 64 transmits the driving force to the hub body 60 and rotates about the hub axle 52 together with the hub body 60. The freewheel 64 has a ratchet mechanism 64A functioning as a one-way clutch. The freewheel 64 allows transmission of rotation to the hub body 60 in a first rotation direction and prohibits transmission of rotation to the hub body 60 in a second rotation direction opposite to the first rotation direction.

The electronic component 66 is electrically connected to the electric component 62 and fixed to the hub axle 52. In one example, the electronic component 66 is electrically connected to the electric power generator 62A by the cable 68 and is provided between the hub axle 52 and the freewheel 64 in the radial direction of the hub axle 52.

The hub unit 50 further includes a cable 80 (i.e., an electrical cable in the illustrated embodiment). The cable 80 is wired to the bicycle 10 and electrically connected to the electric power generator 62A and the electronic component 66. The cable 80 electrically connects the electronic component 66 and a corresponding one of the bicycle components 38. The corresponding one of the bicycle components 38 is, for example, the first shifting unit 40A (refer to FIG. 1). The electric power generated by the electric power generator 62A is supplied to the first shifting unit 40A through the cable 68, the electronic component 66 and the cable 80. The first shifting unit 40A is driven by the electric power. Additionally, the electronic component 66 includes, for example, a control circuit (not shown) having a processor (not shown) for controlling the first shifting unit 40A. The control circuit of the electronic component 66 drives the first shifting unit 40A to change the rear sprocket 34A on which the chain 36 runs. Since the electronic component 66 is located close to the first shifting unit 40A, the cable 80 can be shortened.

At least one of the hub axle 52 and the rotation restriction member 70 has a cable guide structure configured to guide the cable 80 in a region including the rotation restriction member 70 in the axial direction DA of the hub axle 52. In one example, both the hub axle 52 and the rotation restriction member 70 have the cable guide structure configured to guide the cable 80.

The rotation restriction member 70 has a cable guide structure configured to guide the cable 80. The rotation restriction member 70 has a cable guide structure configured to guide the cable 80 in the axial direction DA of the hub axle 52 so that the cable 80 is located at an outer side of an inner surface 14A of the frame 12, which is located closer to a center line CL of the frame 12 with respect to the axial direction DA of the hub axle 52. The rotation restriction member 70 has a cable guide structure configured to guide the cable 80 in the radial direction of the hub axle 52 between the inner surface 14A and an outer surface 14B of the frame 12 opposite to the inner surface 14A. In the example shown in FIG. 2, the cable 80, which is guided by the rotation restriction member 70, passes through a region between the inner surface 14A and the outer surface 14B of the frame 12 in the axial direction DA of the hub axle 52. The rotation restriction member 70 corresponds to a guide member 70 having a cable guide structure configured to guide the cable 80. The guide member 70 of the illustrated embodiment is the rotation restriction member 70, which couples the hub axle 52 to the frame 12 so that rotation relative to the hub axle 52 and the frame 12 is restricted.

The hub axle 52 has a structure configured to be fixed to the frame 12 with a wheel holding mechanism 90. The hub axle 52 includes an axle body 54 and a communication hole 55. The communication hole 55 is provided in the axle body 54 to extend in the axial direction DA of the hub axle 52.

The wheel holding mechanism 90 includes a lever 92, a support portion 94, a shaft 96 and a holder 98. The lever 92 is provided on the support portion 94 to be movable relative to the support portion 94. The shaft 96 is provided on the support portion 94 to extend from the support portion 94. The holder 98 is detachably attached to the shaft 96. In one example, the lever 92 is operated to extend and contract the shaft 96 with respect to the support portion 94 to change the distance between the support portion 94 and the holder 98.

The rotation restriction member 70 is coupled to the hub axle 52 so that the cable 80 is guided by the rotation restriction member 70. The hub axle 52 is coupled to the frame 12 by the rotation restriction member 70. The shaft 96 of the wheel holding mechanism 90 is inserted into the communication hole 55 of the hub axle 52. After the holder 98 is coupled to the shaft 96, the lever 92 is operated to fix the wheel holding mechanism 90 to the frame 12 and also the hub axle 52 to the frame 12. As described above, the hub unit 50 is coupled to the frame 12.

Figure 3:
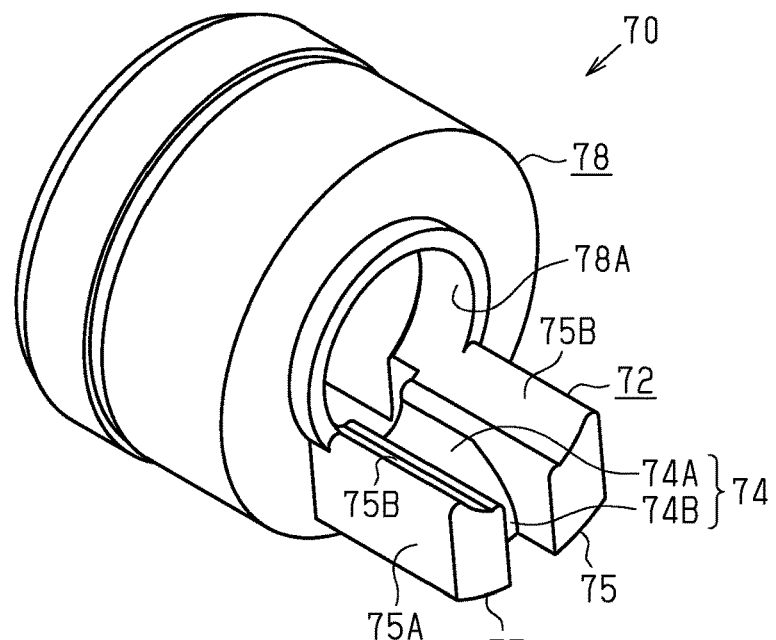
FIG. 3 is a perspective view of a rotation restriction member shown in FIG. 2.

As shown in FIG. 3, the rotation restriction member 70 includes a first part 72, a second part 78 and a groove 74 (cable guide groove). The first part 72 and the second part 78 are, for example, provided integrally with each other. In a state where the rotation restriction member 70 is coupled to the hub axle 52, the first part 72 is located at an outer side of the second part 78 in the axial direction DA of the hub axle 52 (refer to FIG. 4). The second part 78 has a structure configured to support the hub axle 52. The second part 78 includes an insertion hole 78A, through which the hub axle 52 is insertable. One example of the shape of the second part 78 is a tubular shape. The groove 74 is configured to guide the cable 80 (refer to FIG. 4). The groove 74 is provided, for example, in the first part 72.

The first part 72 includes the groove 74 and two restriction portions 75. The groove 74 is provided between the restriction portions 75. The groove 74 includes a first groove section 74A and a second groove section 74B. The first groove section 74A extends in the axial direction DA of the hub axle 52 so that the cable 80 is guided in the axial direction DA of the hub axle 52. The second groove section 74B extends in the radial direction of the hub axle 52 so that the cable 80 is guided in the radial direction of the hub axle 52. In one example, the second groove section 74B extends in a height-wise direction of the bicycle 10 so that the cable 80 is guided in the height-wise direction of the bicycle 10 (refer to FIG. 1). The first groove section 74A and the second groove section 74B are continuous with each other. The first groove section 74A is shorter than the restriction portions 75 in the axial direction DA of the hub axle 52. The second groove section 74B guides the cable 80 in the radial direction of the hub axle 52 between the inner surface 14A and the outer surface 14B of the frame 12. More specifically, the second groove section 74B is provided between the inner surface 14A and the outer surface 14B of the frame 12 at a location between the two restriction portions 75. The cable 80, which extends from the electronic component 66 (refer to FIG. 2), is arranged along the first groove section 74A and the second groove section 74B so that the cable 80 is guided to a generally lower side of the bicycle 10 (refer to FIG. 4). The cable 80, which is guided to the lower side of the bicycle 10, is connected to the first shifting unit 40A (refer to FIG. 1).

The restriction portions 75 extend from the second part 78 in the axial direction DA of the hub axle 52. Each of the restriction portions 75 includes a contact surface 75A and a support surface 75B. The contact surface 75A is in contact with the frame 12 in a state where the rotation restriction member 70 is coupled to the frame 12. The support surface 75B supports the hub axle 52 in a state where the hub axle 52 is inserted into the insertion hole 78A of the second part 78.

Figure 4:
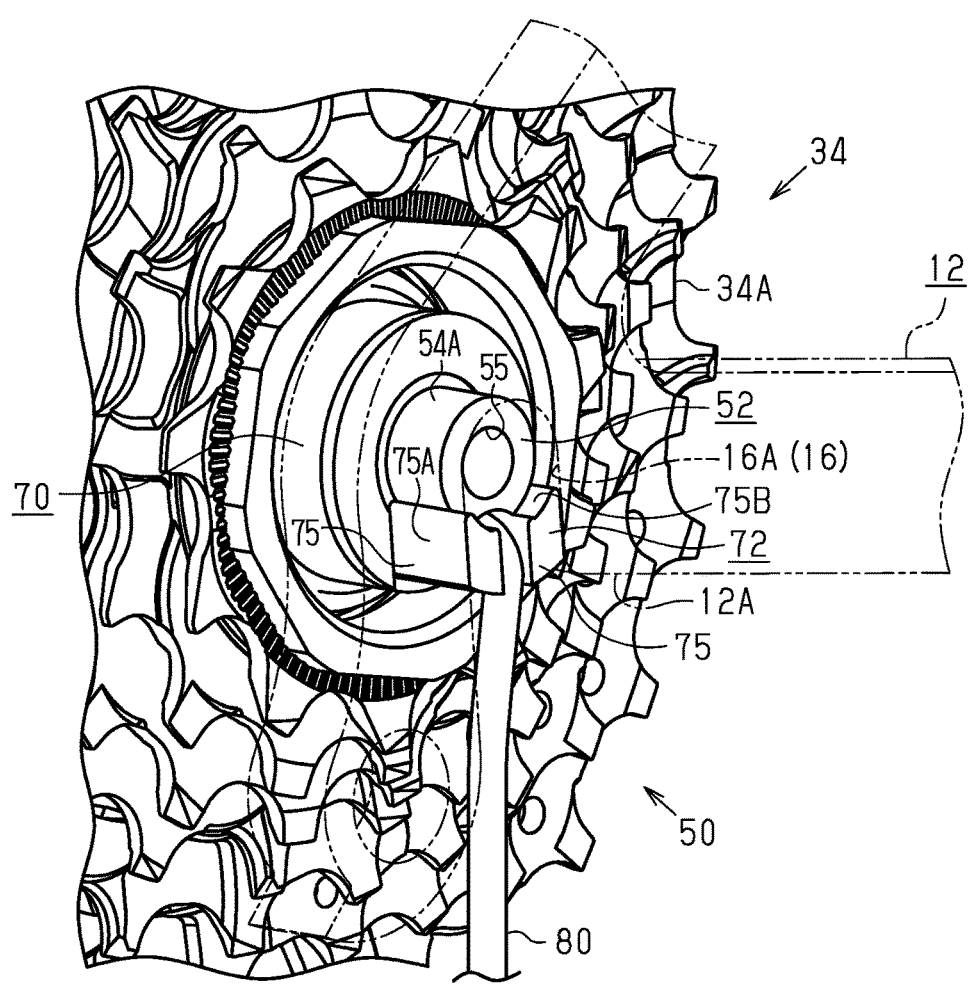
FIG. 4 is a perspective view of the rotation restriction member shown in FIG. 2 and its surroundings.

As shown in FIG. 4, the rotation restriction member 70 is shaped to fit into a groove 16 of the frame 12 so that rotation relative to the frame 12 is restricted. In one example, the first part 72 is shaped to fit into the groove 16 of the frame 12. In a case where the hub axle 52 is coupled to the frame 12, the groove 16 of the frame 12 allows the hub axle 52 to pass through. In a case where the first part 72 of the rotation restriction member 70 is fitted into the groove 16 of the frame 12 and the contact surface 75A of each restriction portion 75 is in contact with an inner surface 16A of the groove 16, rotation of the rotation restriction member 70 relative to the frame 12 is restricted.

Figure 5:
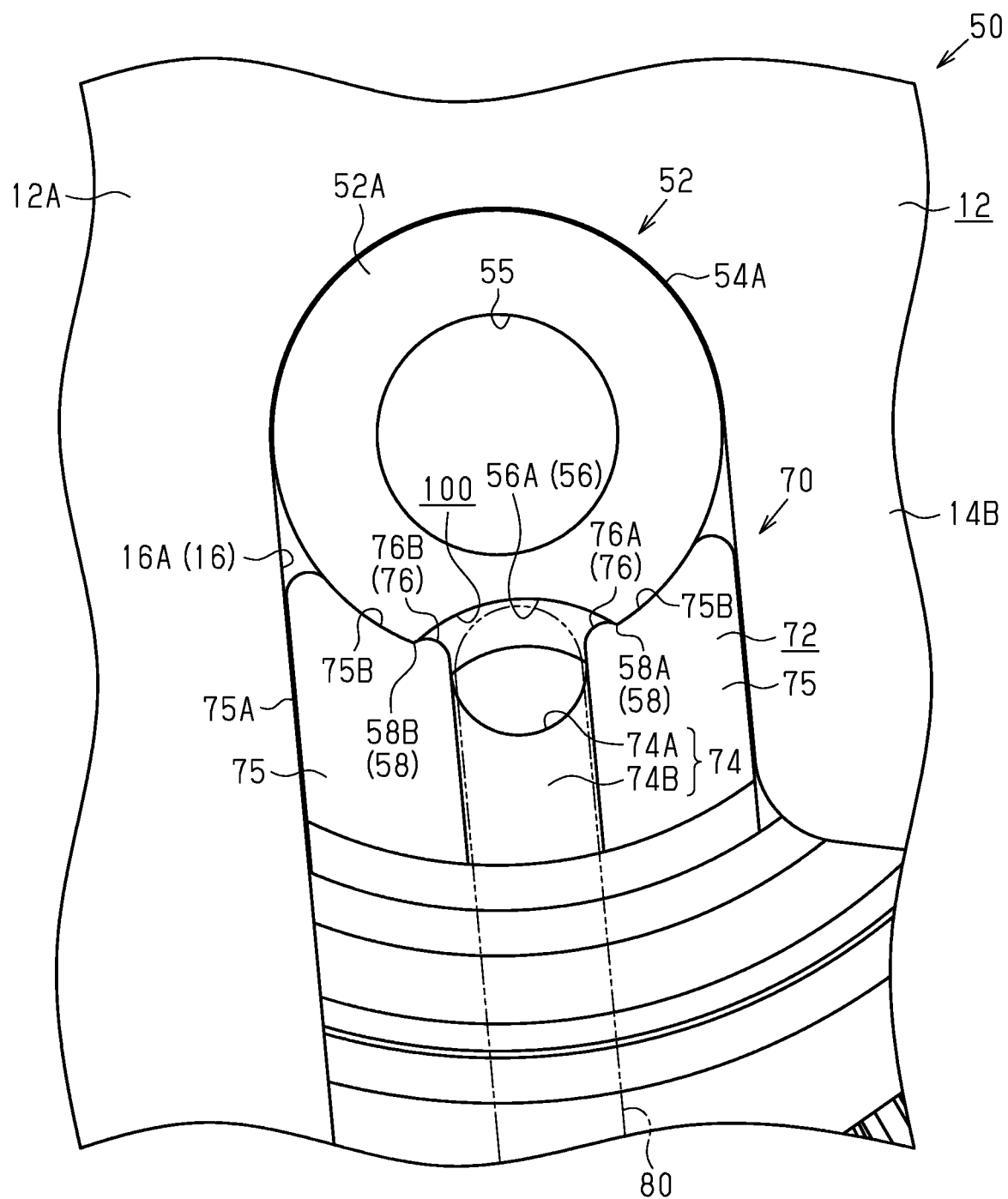
FIG. 5 is a side elevational view of the rotation restriction member shown in FIG. 2 and its surroundings.

As shown in FIG. 5, the rotation restriction member 70 further includes a first engagement portion 76. The first engagement portion 76 engages with the hub axle 52 to restrict rotation of the hub axle 52. The first engagement portion 76 includes a first projection 76A and a second projection 76B. The first projection 76A restricts rotation of the hub axle 52 in one direction. In one example, the first projection 76A is provided on the support surface 75B of one of the restriction portions 75. The second projection 76B restricts rotation of the hub axle 52 in the other direction. In one example, the second projection 76B is provided on the support surface 75B of the other restriction portion 75.

The hub axle 52 includes a recess 56. The recess 56 has a structure configured to guide the cable 80. The recess 56 is a groove 56A provided in an outer circumferential surface 54A of the hub axle 52 to extend in the axial direction DA of the hub axle 52. For example, the groove 56A extends in the outer circumferential surface 54A of the hub axle 52 from one end 52A of the hub axle 52 to a further end 52B of the hub axle 52 (refer to FIG. 2). In a state where the rotation restriction member 70 is coupled to the hub axle 52, the groove 56A of the hub axle 52 and the groove 74 of the rotation restriction member 70 form a single guide hole 100, through which the cable 80 is insertable. The guide hole 100 is smaller than a connector 82 (refer to FIG. 2) of the cable 80 that is connected to the electronic component 66 (refer to FIG. 2). Thus, the guide hole 100 prevents removal of the connector 82 of the cable 80. Here, as seen in FIG. 2, the connector 82 of the cable 80 is a male electrical connector that plugs into the electrical female connector 66A that is electrically connected to the electronic component 66. Since the cables 68 and 80 are both electrically connected to the electronic component 66, the electric power generated by the electric power generator 62A can be supplied one or more of the bicycle components 38 as well as the battery B.

The hub axle 52 further includes a second engagement portion 58. The second engagement portion 58 engages with the first engagement portion 76 of the rotation restriction member 70. The second engagement portion 58 includes a first projection 58A and a second projection 58B. The first projection 58A engages with, for example, the first projection 76A of the first engagement portion 76. The first projection 58A includes one edge of the groove 56A in the hub axle 52. The second projection 58B engages with, for example, the second projection 76B of the first engagement portion 76. The second projection 58B includes the other edge of the groove 56A in the hub axle 52. In a case where the rotation restriction member 70 is coupled to the hub axle 52 so that the first engagement portion 76 and the second engagement portion 58 engage with each other, rotation of the hub axle 52 relative to the rotation restriction member 70 is restricted.

Modified Example

The above description illustrates one embodiment of a bicycle hub unit according to the present invention and is not intended to be restrictive. The embodiment of the bicycle hub unit of the present invention can be modified, for example, as follows. Further, two or more of the modified examples can be combined. In the following modified examples, the same reference characters are given to those elements that are the same as the corresponding elements of the embodiment. Such elements will not be described in detail.

The bicycle component 38 electrically connected to the cable 80 can be changed. In one example, the bicycle component 38 electrically connected to the cable 80 includes at least one of the second shifting unit 40B, the electric suspension 42, the electric adjustable seatpost 44, the electric power assist device, the lamp 46, and the cycle computer 48 instead of or in addition to the first shifting unit 40A.

The structure of the first engagement portion 76 can be changed. In one example, the first engagement portion 76 includes a single projection restricting rotation of the hub axle 52 in one direction and the other direction. In this example, the second engagement portion 58 includes a single recess engaging with the single projection.

The relationship between the rotation restriction member 70 and the hub axle 52 can be changed. In a first example, the rotation restriction member 70 is fixed to the hub axle 52. In a second example, the rotation restriction member 70 is provided integrally with the hub axle 52. In a third example, the rotation restriction member 70 is fixed to the frame 12.

The position to which the rotation restriction member 70 is coupled can be changed. In one example, the rotation restriction member 70 is provided on the hub axle 52 to be coupled to the frame 12 at a position distant from the rear sprockets 34A of the bicycle 10.

The shape of the rotation restriction member 70 can be changed. In one example, the rotation restriction member 70 is shaped so as not to fit into the groove 16 of the frame 12. In this example, the rotation restriction member 70 includes a member configured to be coupled to the frame 12 so that rotation relative to the frame 12 is restricted. In a second example, the rotation restriction member 70 is shaped to fit into the groove 16 of the frame 12 so that rotation relative to the frame 12 is restricted. In this example, the rotation restriction member 70 functions as the guide member 70. The guide member 70 is provided on the hub axle 52 so that rotation relative to the hub axle 52 is restricted and has a structure configured to guide the cable 80 so that the cable 80 is located at an outer side of the inner surface 14A of the frame 12 in the axial direction DA of the hub axle 52. In one example, in a case where the hub axle 52 is fixed to the frame 12 with the wheel holding mechanism 90, rotation of the hub axle 52 and the guide member 70 relative to the frame 12 is restricted.

The structure of the rotation restriction member 70 can be changed. In a first example, the rotation restriction member 70 has a structure configured to guide the cable 80 so that the cable 80 outwardly extends from the outer surface 14B of the frame 12 in the axial direction DA of the hub axle 52. In a second example, the rotation restriction member 70 has a structure configured to guide the cable 80 so that the cable 80 is located at an inner side of the inner surface 14A of the frame 12 in the axial direction DA of the hub axle 52. In a third example, the rotation restriction member 70 does not have a structure configured to guide the cable 80.

The structure of the recess 56 in the hub axle 52 can be changed. In one example, the recess 56 does not have a structure configured to guide the cable 80. The region of the groove 56A in the outer circumferential surface 54A of the hub axle 52 can be changed. In one example, the groove 56A is provided in the outer circumferential surface 54A of the hub axle 52 in only a region including the rotation restriction member 70 in the axial direction DA of the hub axle 52.

The means for fixing the hub axle 52 can be changed. In one example, the hub axle 52 has a structure configured to be fixed to the frame 12 with a nut (not shown). The position to which the hub axle 52 is coupled can be changed. In one example, the hub axle 52 is provided on the front wheel 18 of the bicycle 10.

At least one of the electric power generator 62A, the electronic component 66, the cable 68, and the cable 80 can be omitted from the hub unit 50. In a first example, the electric power generator 62A is omitted from the hub unit 50. In this example, the electronic component 66 and the battery B are electrically connected by the cable 68. In a second example, the electric power generator 62A, the electronic component 66, and the cable 68 are omitted from the hub unit 50. In this example, the bicycle components 38 and the battery B are electrically connected by the cable 80. In a third example, the electric power generator 62A, the electronic component 66, the cable 68, and the cable 80 are omitted from the hub unit 50. In this example, the structure configured to guide the cable 80 can be omitted from the hub axle 52 and the rotation restriction member 70.

What is claimed is:
1. A bicycle hub unit comprising:
a hub axle configured to be coupled to a frame of a bicycle;

a freewheel rotatable about the hub axle; and a rotation restriction member configured to couple the hub axle to the frame so that rotation relative to the hub axle and the frame is restricted, at least one of the hub axle and the rotation restriction member including a cable guide structure configured to guide a cable in a region including the rotation restriction member in an axial direction parallel to a center longitudinal axis of the hub axle, and the cable electrically connecting an electric component and an electronic component, the electronic component being arranged to at least partially overlap a portion of the freewheel in a radial direction of the hub axle, the portion being configured to support a rear sprocket of the bicycle.

2. The bicycle hub unit according to claim 1, further comprising
the electronic component fixed to the hub axle.

3. The bicycle hub unit according to claim 1, wherein
the rotation restriction member is detachably attached to the hub axle.

4. The bicycle hub unit according to claim 1, wherein
the rotation restriction member has the cable guide structure that is configured to guide the cable in the axial direction of the hub axle so that the cable is located at an outer side of an inner surface of the frame, which is located closer to a center line of the frame with respect to the axial direction of the hub axle.

5. The bicycle hub unit according to claim 1, wherein
the rotation restriction member includes a first engagement portion engaging with the hub axle to restrict rotation of the hub axle.

6. The bicycle hub unit according to claim 1, wherein
the rotation restriction member is shaped to fit into a groove of the frame so that rotation relative to the frame is restricted.

7. The bicycle hub unit according to claim 6, wherein
in a case where the hub axle is coupled to the frame, the groove of the frame allows the hub axle to pass through.

8. The bicycle hub unit according to claim 1, wherein
the hub axle is configured to be provided on a rear wheel of the bicycle.

9. The bicycle hub unit according to claim 1, wherein
the hub axle is configured to be provided on a rear wheel of the bicycle, and
the rotation restriction member is provided on the hub axle to be coupled to the frame at a position close to the rear sprocket.

10. The bicycle hub unit according to claim 1, wherein
the hub axle has a structure configured to be fixed to the frame with a wheel holding mechanism.

11. A bicycle hub unit comprising:
a hub axle configured to be coupled to a frame of a bicycle;
a freewheel rotatable about the hub axle;
a rotation restriction member configured to couple the hub axle to the frame so that rotation relative to the hub axle and the frame is restricted;
a hub body provided on the hub axle to be rotatable about the hub axle; and
an electric power generator that generates electric power based on rotation of the hub body relative to the hub axle,
at least one of the hub axle and the rotation restriction member including a cable guide structure configured to guide a cable in a region including the rotation restriction member in an axial direction parallel to a center longitudinal axis of the hub axle, and the cable electrically connecting the electric power generator to an electronic component, the electronic component being arranged to at least partially overlap the freewheel in a radial direction of the hub axle.

12. A bicycle hub unit comprising:
a hub axle coupled to a frame of a bicycle, and the hub axle including a recess, the recess including a groove that is provided in an outer circumferential surface of the hub axle and extends in an axial direction parallel to a center longitudinal axis of the hub axle; and
a rotation restriction member including a first engagement portion engaging with the recess of the hub axle,
the rotation restriction member being configured to couple the hub axle to the frame so that rotation relative to the hub axle and the frame is restricted, and
the rotation restriction member being detachably attached to the hub axle.

13. The bicycle hub unit according to claim 12, wherein
the recess has a cable guide structure configured to guide a cable wired to the bicycle.

14. The bicycle hub unit according to claim 12, wherein
the rotation restriction member has a cable guide structure configured to guide a cable wired to the bicycle.

15. The bicycle hub unit according to claim 12, wherein
the first engagement portion includes a first projection restricting rotation of the hub axle in one direction and a second projection restricting rotation of the hub axle in another direction.

16. The bicycle hub unit according to claim 12, wherein
the hub axle includes a second engagement portion engaging with the first engagement portion.

17. A bicycle hub unit comprising:
a hub axle configured to be coupled to a frame of a bicycle; and
a rotation restriction member configured to couple the hub axle to the frame so that rotation relative to the hub axle and the frame is restricted,
the rotation restriction member including a cable guide structure configured to guide a cable that electrically connects an electric component and an electronic component,
the cable guide structure being configured to guide the cable in a region including the rotation restriction member in an axial direction parallel to a center longitudinal axis of the hub axle, so that the cable is located at an outer side of an inner surface of the frame, the inner surface being located closer to a center line of the frame than an outer surface of the frame with respect to the axial direction of the hub axle, and
the cable guide structure being further configured to guide the cable in a radial direction of the hub axle between the inner surface and an outer surface of the frame opposite to the inner surface.

18. The bicycle hub unit according to claim 1, wherein
the cable guide structure includes a groove configured to guide the cable.

19. A bicycle hub unit comprising:
a hub axle coupled to a frame of a bicycle;
a hub body provided on the hub axle to be rotatable about the hub axle;
an electric power generator generating electric power based on rotation of the hub body relative to the hub axle;

a freewheel rotatable about the hub axle; and a guide member provided on the hub axle so that rotation relative to the hub axle is restricted, the guide member including a cable guide structure configured to guide a cable in the axial direction of the hub axle so that the cable is located at an outer side of an inner surface of the frame, the inner surface being located closer to a center line of the frame than an outer surface of the frame with respect to an axial direction parallel to a center longitudinal axis of the hub axle, and the cable electrically connecting the electric power generator and an electronic component, the electronic component being arranged to at least partially overlap the freewheel in a radial direction of the hub axle.

20. The bicycle hub unit according to claim 19, wherein the cable guide structure is configured to guide the cable in a radial direction of the hub axle between the inner surface and the outer surface of the frame.

21. The bicycle hub unit according to claim 19, wherein the guide member includes a groove configured to guide the cable.

22. The bicycle hub unit according to claim 19, wherein the guide member is detachably attached to the hub axle.

23. The bicycle hub unit according to claim 19, wherein the guide member includes a rotation restriction member coupling the hub axle to the frame so that rotation relative to the hub axle and the frame is restricted.

* * * * *